United States Patent [19]

Takikawa

[11] Patent Number: 4,636,896
[45] Date of Patent: Jan. 13, 1987

[54] DISK RECORDING AND PLAYBACK APPARATUS HAVING MAGNETIC HEAD SEPARATION DEVICE

[75] Inventor: Makito Takikawa, Furukawa, Japan
[73] Assignee: Alps Electric Co., Ltd., Japan
[21] Appl. No.: 620,012
[22] Filed: Jun. 13, 1984
[30] Foreign Application Priority Data
  Jun. 13, 1983 [JP] Japan .............................. 58-89073[U]
[51] Int. Cl.⁴ ...................... G11B 17/02; G11B 21/12; G11B 21/22
[52] U.S. Cl. ...................................... 360/105; 360/97
[58] Field of Search ............................. 360/105, 97–99

[56] References Cited

U.S. PATENT DOCUMENTS 4,193,102 3/1980 Beuch et al. .......................... 360/105
4,360,844 11/1982 Maiers .................................... 360/99
4,415,940 11/1983 Becker ................................. 360/105
4,504,879 3/1985 Toldi et al. .......................... 360/105

Primary Examiner—Robert S. Tupper
Attorney, Agent, or Firm—Guy W. Shoup

[57] ABSTRACT

A disk recording and playback apparatus comprises a housing base, a cam body rotatably mounted on the housing base and actuatable in response to insertion of a magnetic disk, a bail mounted on the housing base and angularly movable toward and away from the housing base in response to actuation of the cam body, and a magnetic head mounted on the housing base and movable toward and away from an operative position in response to movement of the bail. When the magnetic disk is not inserted, the magnetic head is positioned away from the operative position by the bail disposed away from the housing base by the cam body, and when the disk is inserted, the cam body is actuated to release the bail to allow the magnetic head to be moved to the operative position.

4 Claims, 8 Drawing Figures

DISK RECORDING AND PLAYBACK APPARATUS HAVING MAGNETIC HEAD SEPARATION DEVICE

BACKGROUND OF THE INVENTION

1. Field of the Invention

The present invention relates to a disk recording and playback apparatus, and more particularly to a head loading mechanism in a disk recording and playback apparatus.

2. Description of the Prior Art

Head loading mechanisms in conventional disk recording and playback apparatus include an electromagnetic bail energizable for turning or sliding the bail to load a magnetic head.

Use of the solenoid makes the head loading mechanism costly of necessity. The circuit of the disk recording and playback apparatus is adversely affected by noise generated when the solenoid is turned on and off. To cope with this problem, it is necessary to provide the solenoid with a shield, making the solenoid construction larger in size and more costly. Another problem is that operation of the solenoid is noisy.

Various head loading mechanisms using no solenoid have been studied, but such head loading mechanisms still suffer from problems. To meet the requirement of a higher capacity in recent years, there has been proposed a disk recording and playback apparatus having two upper and lower magnetic heads disposed in confronting relation for sandwiching a magnetic disk therebetween for recording or reproducing information. With this type of disk recording and playback apparatus, when the door to a disk insertion slot is closed with no magnetic disk inserted, one of the magnetic heads which is movable hits the other fixed magnetic head under the resiliency of a spring, causing damage to the magnetic heads and adversely affecting the recording and playback characteristics.

There is also known a disk recording and playback apparatus which does not employ two magnetic heads, but has a pad in place of the movable magnetic head as referred to above for sandwiching a magnetic disk between the pad and the fixed magnetic head. When the door to the magnetic insertion slot is closed with no magnetic disk inserted, the pad hits the magnetic disk under the resiliency of the spring. Short fibers then come off the pad and get attached to the magnetic head, adversely affecting the recording and playback characteristics.

SUMMARY OF THE INVENTION

It is an object of the present invention to provide a disk recording and playback apparatus in which magnetic heads are prevented from hitting each other when the door to a disk insertion slot is closed with no magnetic disk inserted.

According to the present invention, a disk recording and playback apparatus comprises a housing base, a cam body rotatably mounted on the housing base and actuatable in response to insertion of a magnetic disk, a bail mounted on the housing base and angularly movable toward and away from the housing base in response to actuation of the cam body, and a magnetic head mounted on the housing base and movable toward and away from an operative position in response to movement of the bail. When the magnetic disk is not inserted, the magnetic head is positioned away from the operative position by the bail disposed away from the housing base by the cam body, and when the disk is inserted, the cam body is actuated to release the bail to allow the magnetic head to be moved to the operative position.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
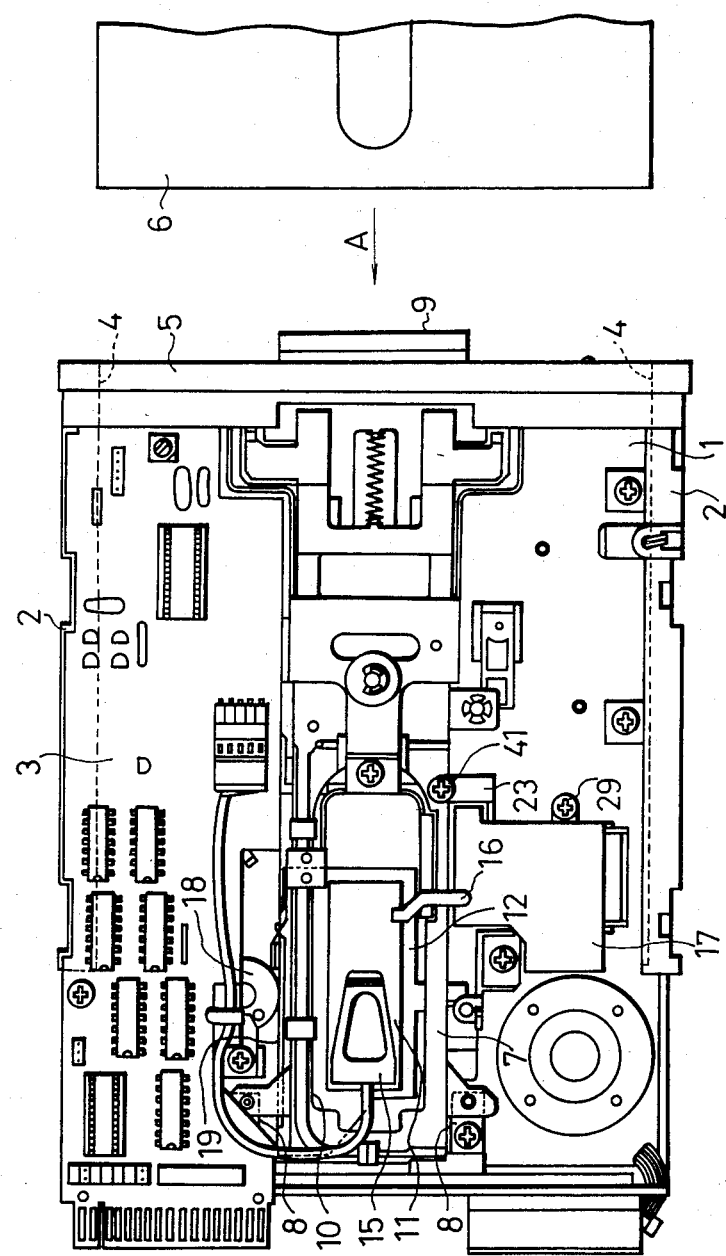
FIG. 1 is a plan view of a disk recording and playback apparatus according to the present invention.

As shown in FIG. 1, a disk recording and playback apparatus includes a housing base 1 in the form of an aluminum die casting with disk guide walls 2, 2 attached to opposite side edges of the housing base 1. A printed-circuit board 3 is mounted on one of the disk guide walls 2. A front plate 5 having a disk insertion slot 4 is fixed to a front face of the housing base 1. A magnetic disk 6 can be inserted through the disk insertion slot 4 into the apparatus in the direction of the arrow A.

A door frame 7 extends from a central portion of a rear end of the housing base 1 toward the front plate 5. The door frame 7 has a rear end coupled to the housing base 1 by a pair of hinges 8 comprising leaf springs. The door frame 7 is normally urged under the resilient force of the hinges 8 to move in a direction away from the housing base 1 (normal to the sheet of FIG. 1), or to move in a door opening direction. The door frame 7 has on its distal end a door knob 9 connected thereto and projecting through the disk insertion slot 4 out of the front plate 5. The disk insertion slot 4 can be closed by holding the door knob 9 and turning the door frame 7 toward the housing base 1. The door knob 9 can then be locked on the front plate 5 with the disk insertion slot 4 closed. Therefore, when the door frame 7 is in a position furthest from the housing base 1, the disk insertion slot 4 is open, and when the door frame 7 is in a position closest to the housing base 1, the disk insertion slot 4 is closed. The door can be opened and closed by operating the door knob 9 on the exterior of the apparatus.

The door frame 7 has an opening 10 defined centrally in a rear end portion thereof and extending longitudinally thereof. A swingable head carriage 11 is disposed in the opening 10, and a fixed head carriage 12 is located below the swingable head carriage 11. The swingable head carriage 11 is swingably mounted at its proximal end on the fixed head carriage 12 by a pin (not shown).

Figure 5:
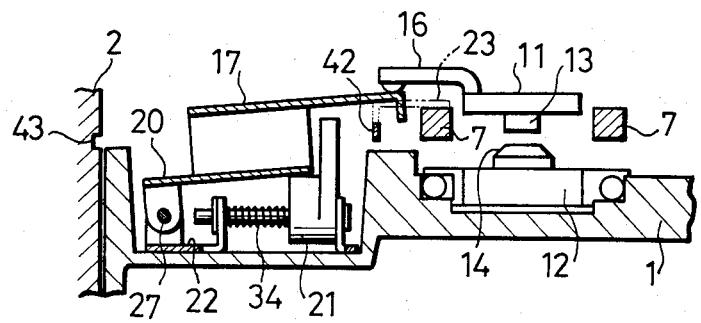
FIGS. 5 through 7 are cross-sectional views illustrative of operation of the parts at the time a magnetic disk is inserted into and removed from the disk recording and playback apparatus.
Figure 6:
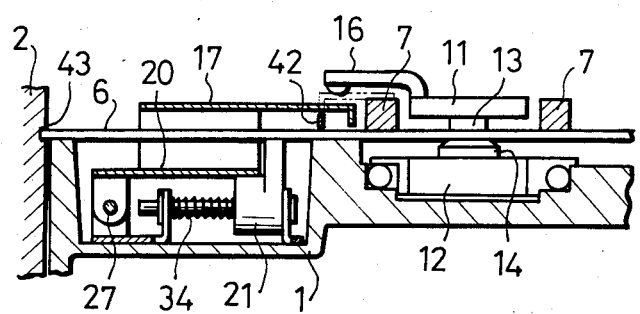
Figure 7:
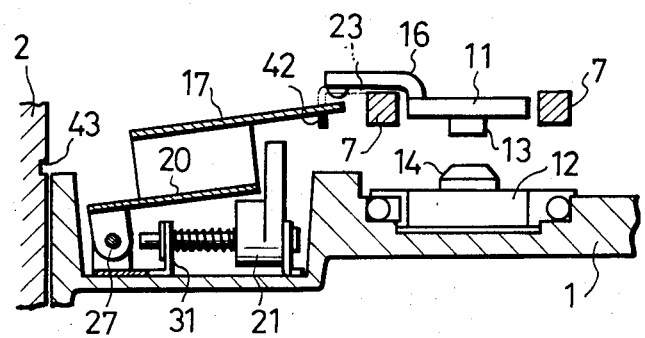

As shown in FIGS. 5 through 7, a first magnetic head 13 is mounted on the swingable head carriage 11, and a second magnetic head 14 is mounted on the fixed head carriage 12, with the first and second magnetic heads 13, 14 being disposed in confronting relation.

The swingable head carriage 11 is normally urged toward the fixed head carriage 12 under the resilient force of a leaf spring 15. A loading arm 16 is attached to a free end of the swingable head carriage 11. The loading arm 16 extends over the door frame 7 to a position above a bail 17 located adjacent to the door frame 7. Therefore, the loading arm 16 can engage the door frame 7 and the bail 17.

The fixed head carriage 12 has a portion fixed to a metal band 19 looped around a pulley 18. Rotative power from a drive motor (not shown) is transmitted through the pulley 18 and the metal band 19 to the fixed head carriage 12 for displacing the fixed head carriage 12 and the swingable head carriage 11 pivotally connected thereto in the longitudinal direction of the door frame 7.

A head loading mechanism will now be described in detail. The head loading mechanism is mainly composed of the bail 17, a bail attachment plate 20, a cam body 21, a base plate 22, and a lifter 23.

Figure 2:
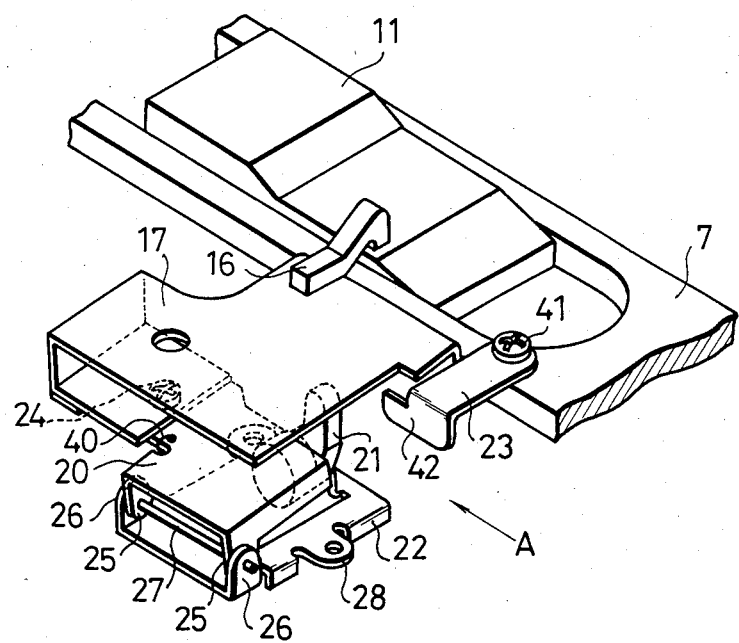
FIG. 2 is a perspective view of a head loading mechanism in the disk recording and playback apparatus shown in FIG. 1.
Figure 3:
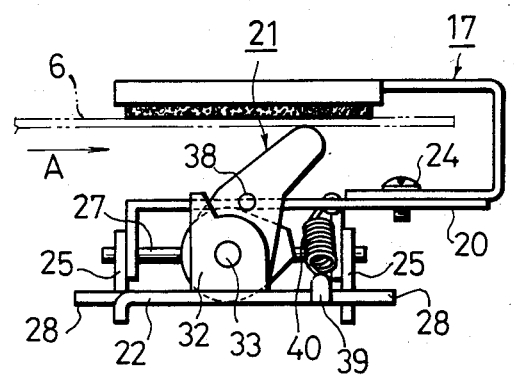
FIG. 3 is a side elevational view of the head loading mechanism illustrated in FIG. 2.

As illustrated in FIGS. 2 and 3, the bail 17 is fixed to the bail attachment plate 20 by a screw 24. The bail attachment plate 20 has at one end thereof a pair of depending portions 25 spaced a distance from each other. The base plate 22 also has at one end thereof a pair of upstanding portions 26 spaced a distance from each other. The bail attachment plate 20 and the bail 17 are angularly movably supported on the base plate 22 by a shaft 27 extending through the depending and upstanding portions 25, 26.

Figure 4:
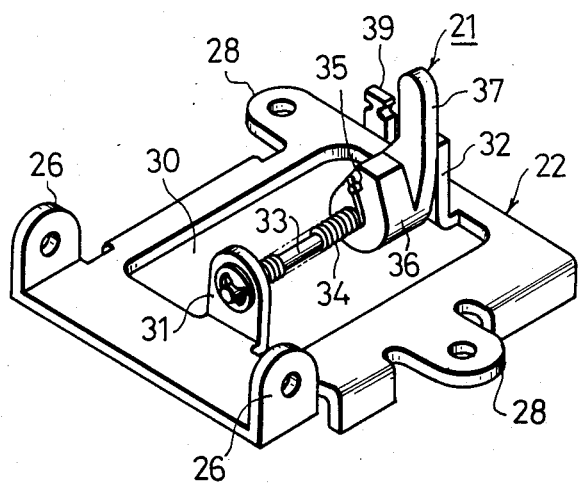
FIG. 4 is a perspective view of a cam body and a base plate in the head loading mechanism.

As illustrated in FIG. 4, the base plate 22 has a pair of ears 28 on opposite sides thereof, and is fastened to the housing base 1 by screws 29 extending through the ears 28 threadedly into the housing base 1. The base plate 22 has a central hole 30, and a bearing 31 and a stop 32 disposed in confronting relation across the central hole 30. A shaft 33 extends between and is supported by the bearing 31 and the stop 32. A cam body return spring 34 is disposed around the shaft 33 and the cam body 21 is rotatably supported on the shaft 33. The cam body return spring 34 has one end engaging the bearing 31 and the other end engaging a pin 35 projecting on the cam body 21. The cam body 21 is normally urged by the cam body return spring 34 toward the disk insertion slot 4 and against the stop 32.

As shown in FIGS. 3 and 4, the cam body 21 has a thicker cam 36 and a tongue 37 projecting therefrom, the pin 35 being disposed on the cam 36. The tongue 37 has a stop pin 38 engageable with the stop 32. When the stop pin 38 engages the stop 32, the tongue 37 is in an upstanding position.

A bail return spring 40 extends between and is attached to the bail attachment plate 20 and an engagement member 39 erected from the base plate 22 near the stop 32. The bail 17 and the bail attachment plate 20 are normally urged under the tension of the bail return spring 40 to move toward the housing base 1. As shown in FIG. 2, the lifter 23 is attached by a screw 41 to the door frame 7 and extends toward the bail 17. The lifter 23 has a lifting step 42 projecting below the bail 17. When the door frame 7 is raised upwardly about the hinges 8, the bail 17 is also turned upwardly about the shaft 27 by engagement with the lifting step 42 of the lifter 23.

FIG. 5 shows the parts position in which the magnetic disc 6 is not inserted in the disk recording and playback apparatus. In this position, the cam body 21 is erected vertically as shown by the solid line in FIG. 8. The bail attachment plate 20 is prevented from being lowered due to abutment against the cam 36. The bail 17 fixed to the bail attachment plate 20 causes the loading arm 16 to lift the swingable head carriage 11, so that the first magnetic head 13 on the swingable head carriage 11 and the second magnetic head 14 on the fixed head carriage 12 are kept spaced out of contact with each other.

FIG. 6 illustrates the postion in which the magnetic disk 6 is mounted in the disk recording and playback apparatus. When the magnetic disk 6 is inserted into the disk insertion slot 4 in the direction of the arrow A as shown in FIG. 1, the magnetic disk 6 enters into the disk recording and playback apparatus along guide grooves 43 in the disk guide walls 2. A portion of the leading edge of the magnetic disk 6 is brought into contact with the tongue 37 of the cam body 21. Continued insertion of the magnetic disk 6 causes the cam body 21 to turn away from the disc insertion slot 4 against the resiliency of the cam body return spring 34 (from the solid-line position to the two-dot-and-dash-line position of FIG. 8). By the time the magnetic disk 6 is completely inserted, the bail attachment plate 20 is allowed to be lowered in contact with an equal-diameter portion of the cam 36. Thus, the bail 17 and the bail attachment plate 20 are turned clockwise as shown in FIG. 6 under the resiliency of the bail return spring 40.

Substantially at the same time that the magnetic disk 6 is fully inserted, the disk insertion slot 4 is closed by the door knob 9 and the door frame 7 is displaced toward the housing base 1. The lifter 23 is also moved downwardly with the door frame 7. Upon movement of the bail 17 and the lifter 23 toward the housing base 1, the loading arm 16 and hence the swingable head carriage 11 are released, and the first magnetic head 13 is moved toward the second magnetic head 14 under the resiliency of the leaf spring 15. The first and second magnetic heads 13, 14 are brought into contact with the magnetic disk sheet for recording information on or reproducing information from the magnetic disk sheet.

Figure 8:
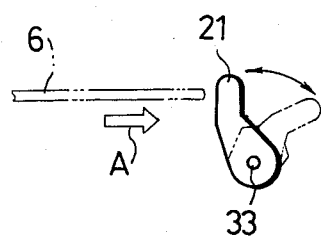
FIG. 8 is a view of the cam body as it is actuated when the magnetic disk is inserted and removed.

Operation of the parts when the magnetic disk 6 is to be removed after recording and playback operation will be described primarily with reference to FIG. 7. When the door knob 9 is moved to open the disk insertion slot 4 for disk removal, the door frame 7 is angularly moved about the hinges 8 away from the housing base 1. Upon such movement of the door frame 7, the lifting step 42 of the lifter 23 raises the bail 17 to its original position. As the bail 17 is returned upwardly, the cam body 21 which has been in the two-dot-and-dash-line position in FIG. 8 is released of pressed engagement with the bail attachment plate 20. The cam body 21 then returns to the upstanding position (indicated by the solid line in FIG. 8) under the resilient force of the cam body return spring 34. The bail attachment plate 20 and the bail 17 are now prevented from being lowered by the cam body 21.

Since the loading arm 16 extends over the door frame 7, the loading arm 16 and the swingable head carriage 11 are moved upwardly with the lifting movement of the door frame 7. As a result, the first magnetic head 13 is displaced away from the second magnetic head 14.

Even when the disk insertion slot 4 is opened and closed by the door knob 9 at this time, only the door frame frame 7 is turned up and down about the hinges 8, and the swingable head carriage 11 is prevented from moving downwardly because the loading arm 16 will engage the bail 17 which is kept from being lowered by the cam body 21. Accordingly, the first and second magnetic heads 13, 14 are kept out of contact with each other.

With the above arrangement, the first and second magnetic heads 13, 14 are prevented from hitting and damaging each other when the door insertion slot 4 is opened and closed with no magnetic disk inserted. Since there is no danger of the magnetic heads 13, 14 becoming damaged, the disk recording and playback apparatus will have stable performance.

While in the illustrated embodiment the two magnetic heads have been illustrated as being provided in confronting relation in the disk recording and playback apparatus, the invention is not limited to such arrangement, but may be applied to a disk recording and playback apparatus in which a magnetic disk is sandwiched between a magnetic head and a pad.

Although a certain preferred embodiment has been shown and described, it should be understood that many changes and modifications may be made therein without departing from the scope of the appended claims.

What is claimed is:

1. A disk recording and playback apparatus comprising:
   (a) a housing base including means defining a path for insertion of a magnetic disk into said apparatus;
   (b) a movable frame above said housing base having a closure member extending from said apparatus, said disk insertion path being defined between said movable frame and said housing base, said frame being movable by said closure member toward and away from said disk insertion path;
   (c) a magnetic head supported on a carriage swingably mounted on said housing base and movable toward and away from said disk insertion path, said carriage having an arm with one end fixed to said carriage and the other end extending therefrom, and when said frame is moved toward said disk insertion path, said magnetic head on said carriage is displaceable by means of said arm between a first position in which it is separated from said disk insertion path and a second position in which it is placed proximate said disk insertion path so as to make operative contact with a magnetic disk inserted in said path;
   (d) a cam body rotatably mounted on said housing base and having a tongue rotatably urged by biasing means into said disk insertion path, said tongue being movable out of said disk insertion path by engagement of a leading edge of an inserted magnetic disk with said tongue;
   (e) a bail arrangement including a movable plate pivotally mounted to a base plate secured on said housing base, said movable plate being ruged by biasing means toward said base plate; and
   (f) said cam body having a cam which is disposed between said movable and said base plates so as to move said movable plate apart from said base plate when said cam body is rotated by its biasing means to place said tongue in said disk insertion path, said movable plate engaging said other end of said arm connected to said carriage for displacing said magnetic head to said first position separated from said disk insertion path when said tongue of said cam body is in said disk insertion path;
   (g) whereby said magnetic head can be held separated from said disk insertion path when a magnetic disk has not been inserted in said disk insertion path even though said closure member has been operated to move said frame toward said disk insertion path.

2. A disk recording and playback apparatus according to claim 1, wherein a second magnetic head is mounted on a fixedly mounted second carriage in opposing relation to the first-described magnetic head on said swingable carriage, said first and second magnetic heads being held separated by said cam body and bail arrangement when a magnetic disk has not been inserted in said disk insertion path even though said closure member has been operated to move said frame toward said disk insertion path.

3. A disc recording and playback apparatus according to claim 1, said baising means comprises a spring.

4. A disc recording and playback apparatus according to claim 1, wherein said other end of said arm has a loading arm engaged by said movable plate when said magnetic head is away from the operative position.

* * * * *